No. 893,478. PATENTED JULY 14, 1908.
P. E. GOEHLE, Sr.
GAGE.
APPLICATION FILED JULY 23, 1907.

Witnesses
F. C. Gibson.
J. W. Garner

Inventor
Paul E. Goehle, Sr.

By Victor J. Evans
Attorney

UNITED STATES PATENT OFFICE.

PAUL E. GOEHLE, SR., OF SAULT STE. MARIE, MICHIGAN, ASSIGNOR OF ONE-HALF TO ROBERT G. FURGERSON, OF SAULT STE. MARIE, MICHIGAN.

GAGE.

No. 893,478.  Specification of Letters Patent.  Patented July 14, 1908.

Application filed July 23, 1907. Serial No. 385,156.

*To all whom it may concern:*

Be it known that I, PAUL E. GOEHLE, Sr., a citizen of the United States of America, residing at Sault Ste. Marie, in the county of Chippewa and State of Michigan, have invented new and useful Improvements in Gages, of which the following is a specification.

This invention is an improved gage attachment for application to a rule, straight edge, or the like implement, to enable the same to be used as a gage for the purpose of scribing work and for similar purposes, and the said invention consists in the construction, combination and arrangement of devices hereinafter described and claimed.

Figure 1:
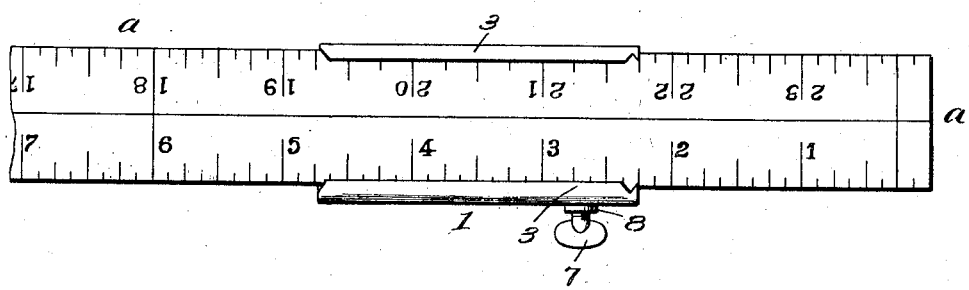
Figure 2:
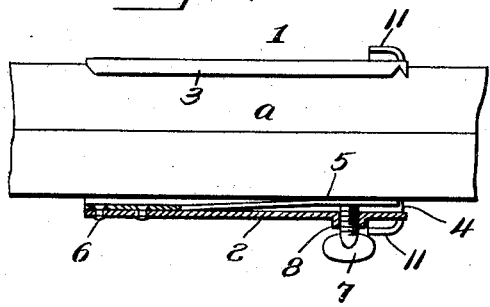
Figure 3:
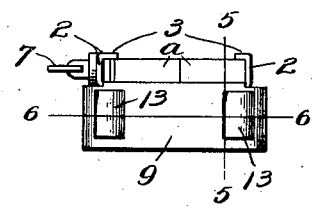
Figure 4:
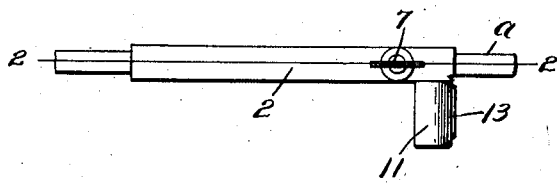
Figure 5:
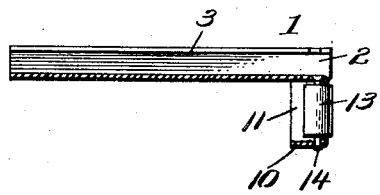
Figure 6:
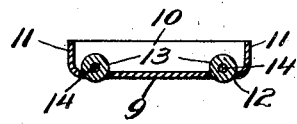

In the accompanying drawings,—Figure 1 is a plan view of a rule provided with my improved gage attachment. Fig. 2 is a similar view with the gage attachment shown partly in section on the line 2—2 of Fig. 4. Fig. 3 is an end elevation. Fig. 4 is a side elevation of the same. Fig. 5 is a longitudinal sectional view of my improved gage attachment on the plane indicated by the line 5—5 of Fig. 3. Fig. 6 is a sectional view of the same on the plane indicated by the line 6—6 of Fig. 3.

My improved gage attachment 1 is made of sheet metal, is of rectangular form and is provided with parallel side walls 2 bent from the said plate and with inwardly extending flanges 3 bent from the said side walls to overhang a rule, straight edge or rod, such as indicated at *a*, and thereby enable the gage attachment to be placed on such rule, straight edge or rod and enable such gage attachment to be moved longitudinally thereon. The width of the space between the side walls 2 of the gage attachment exceeds that of the rule or straight edge so that one of the side walls is spaced from the opposing edge of the rule or straight edge, as at 4, and in this space is a spring 5 which is attached to such wall 2, as at 6, and the free portion of which bears against such edge of the rule or straight edge to create friction between the gage attachment and the rule or straight edge to prevent such gage attachment from being moved too freely on such rule or straight edge. A set screw 7, which is here shown as having a winged head, operates in a threaded opening in the said side wall 2, such as indicated at 8, and bears against such spring and enables the latter to be compressed against the rule or straight edge so as to secure the gage attachment against casual movement after such gage attachment has been placed at the required point on the rule or straight edge.

At the outer end of the gage attachment, and formed integrally therewith is a depending wall 9 which is bent therefrom and is provided at its lower side with a flange 10, parallel with the body of such gage attachment, and at its ends with inturned flanges 11. Such flange 9 is provided with openings 12, and anti-friction rollers 13 are employed which are mounted as on pins or other suitable devices 14 in the spaces formed between the bottom of the gage attachment and the flange 10 and have their outer sides extended through the openings 12. The said anti-friction rollers are adapted to bear against the edge of the board, timber or other work which is to be scribed by a pencil, the point of which is held against the outer end of the rule or straight edge, said rollers enabling the said gage attachment, together with the rule, straight edge or other implement in connection with which it is employed to be moved freely on the said board or timber.

Within the scope of my invention, the spring 5 may be of any suitable construction and may be connected by any suitable means or in any suitable manner to the gage attachment. Other modifications may also be made within the scope of the appended claims, and I do not desire, therefore, to limit myself to the precise construction and arrangement of devices herein shown and described.

Having thus described the invention, what is claimed as new, is:—

1. A gage attachment for rules, straight edges and the like, comprising a body made of sheet metal having its side edges bent to form side walls provided with flanges to engage and overhang such rule, straight edge or the like and having one end bent in the opposite direction to form a depending transverse wall to be disposed opposite the work, a spring in one of the side walls of the body to bear against one edge of the rule, straight edge or the like and a set screw in said wall to apply said spring to or release the same from said edge of the rule, straight edge or the like.

2. A gage attachment for rules, straight edges or the like, comprising a body of sheet metal of rectangular form having its side edges bent in one direction to provide walls having flanges to engage and overhang a rule, straight edge or the like, to attach said body slidably thereto, said body further provided at one end with a bent portion forming an end transversely disposed wall having openings and provided at its ends with inturned flanges, and at its lower side with an inwardly extending flange forming a bottom, and anti-friction rollers mounted in the space between the bottom of the body and the said bottom flange and having their outer sides extended through the said openings, substantially as described.

In testimony whereof, I affix my signature in presence of two witnesses.

PAUL E. GOEHLE, Sr.

Witnesses:
JOHN KILLACKY,
PETER NALLY.